(12) United States Patent
Xu et al.

(10) Patent No.: US 11,284,619 B2
(45) Date of Patent: Mar. 29, 2022

(54) STABLE FORMULATION OF PESTICIDAL PYRIDAZINPYRAZOLAMIDES

(71) Applicant: BASF SE, Ludwigshafen am Rhein (DE)

(72) Inventors: Wen Xu, Research Triangle Park, NC (US); Kara Walden Benton, Research Triangle Park, NC (US); Jeffrey H. Brill, Research Triangle Park, NC (US)

(73) Assignee: BASF SE, Ludwigshafen (DE)

( * ) Notice: Subject to any disclaimer, the term of this patent is extended or adjusted under 35 U.S.C. 154(b) by 197 days.

(21) Appl. No.: 16/485,555

(22) PCT Filed: Feb. 5, 2018

(86) PCT No.: PCT/EP2018/052738
§ 371 (c)(1),
(2) Date: Aug. 13, 2019

(87) PCT Pub. No.: WO2018/149674
PCT Pub. Date: Aug. 23, 2018

(65) Prior Publication Data
US 2020/0045966 A1    Feb. 13, 2020

(30) Foreign Application Priority Data
Feb. 14, 2017 (EP) .................................. 17156011

(51) Int. Cl.
*A01N 43/58* (2006.01)
*A01N 25/02* (2006.01)
*A01N 25/30* (2006.01)

(52) U.S. Cl.
CPC .............. *A01N 43/58* (2013.01); *A01N 25/02* (2013.01); *A01N 25/30* (2013.01)

(58) Field of Classification Search
CPC ........ A01N 43/58; A01N 25/02; A01N 25/30; A01P 5/00; A01P 7/02; A01P 7/04
See application file for complete search history.

(56) References Cited

U.S. PATENT DOCUMENTS

| 2014/0142111 A1 | 5/2014 | Gross et al. |
| 2018/0220664 A1 | 8/2018 | Conesa Roca et al. |

FOREIGN PATENT DOCUMENTS

| WO | WO-2007/077246 A2 | 7/2007 | |
| WO | WO-2010/034737 A1 | 4/2010 | |
| WO | WO-2014063929 A1 * | 5/2014 | ........... C07D 413/14 |
| WO | WO-2016/180833 A1 | 11/2016 | |
| WO | WO-2017/025581 A1 | 2/2017 | |
| WO | WO-2017/025582 A1 | 2/2017 | |
| WO | WO-2018/019828 A1 | 2/2018 | |
| WO | WO-2018/082964 A1 | 5/2018 | |

OTHER PUBLICATIONS

Botteghi, et al., "Asymmetrische katalysen: XLVI. Enantioselektive Hydrosilylierung von Ketonen mit [Rh(COD)Cl]2 und optisch aktiven Stickstoff-Liganden", Journal of Organometallic Chemistry, vol. 370, Issues 1-3, Jul. 11, 1989, pp. 17-31.
Byrne, et al., "Suplementary Experimental Data for W02007/077246", European Patent Register, Jan. 8, 2008, pp. 1-2.
European Search Report for EP Application No. 17156011.3, dated Apr. 4, 2017, 3 pages.
International Search Report for PCT Patent Application No. PCT/EP2018/052738, dated Apr. 16, 2018, 4 pages.

* cited by examiner

*Primary Examiner* — Mina Haghighatian
*Assistant Examiner* — Nathan W Schlientz
(74) *Attorney, Agent, or Firm* — Marshall, Gerstein & Borun LLP

(57) ABSTRACT

The invention relates to an agrochemical composition comprising propylene carbonate, up to 10 wt % of water, and compounds I (I)

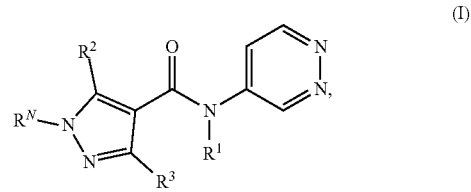

their salts, tautomers, or enantiomers; wherein the variables are as defined in the description. The invention also relates to a process for the preparation of the composition, comprising mixing the propylene carbonate, compounds I, and optionally an acid and/or cyclohexanone. It also relates to a method for controlling pests, which method comprises the application of the composition, or a dilution thereof, to plants, plant propagation material, or the locus of growth of the plants; the pests or their food supply, habitat or breeding grounds. Other objects are the use of cyclohexanone and/or an acid, in particular acetic acid, for stabilizing compositions comprising compounds I; composition for stabilizing water-soluble pesticides as defined in any of claims 1 to 9, comprising 1 to 50 wt % of propylene carbonate, 0.1 to 30 wt % cyclohexanone, and an acid; and an aqueous tank-mix composition comprising the composition in a concentration of 0.01 wt % to 10 wt % with regard to the total weight of the tank-mix.

19 Claims, No Drawings

STABLE FORMULATION OF PESTICIDAL PYRIDAZINPYRAZOLAMIDES

This application is a National Stage application of International Application No. PCT/EP2018/052738, filed Feb. 5, 2018. This application also claims priority under 35 U.S.C. § 119 to European Patent Application No. 17156011.3, filed Feb. 14, 2017.

The invention relates to an agrochemical composition comprising propylene carbonate, up to 10 wt % of water, and compounds I

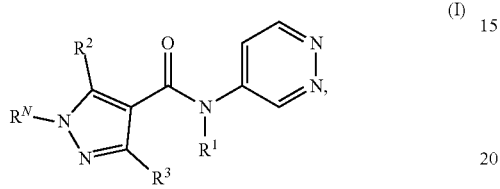

(I)

their salts, tautomers, or enantiomers; wherein the variables have the meaning $R^1$ H, $C_1$-$C_2$-alkyl, or $C_1$-$C_2$-alkoxy-$C_1$-$C_2$-alkyl;

$R^2$ H, halogen, CN, or $NO_2$;
  $C_1$-$C_{10}$-alkyl, $C_2$-$C_{10}$-alkenyl, or $C_2$-$C_{10}$-alkynyl, which are unsubstituted, halogenated, or substituted with $R^x$;
  $OR^a$, $SR^a$, $C(Y)R^b$, $C(Y)OR^c$, $S(O)R^d$, $S(O)_2R^d$, $NR^eR^f$, $C(Y)NR^gR^h$;
  heterocyclyl, hetaryl, $C_3$-$C_{10}$-cycloalkyl, $C_3$-$C_{10}$-cycloalkenyl, or phenyl, which are unsubstituted, or substituted with $R^y$, or $R^x$;

$R^3$ H, halogen, CN, $NO_2$;
  $C_1$-$C_{10}$-alkyl, $C_2$-$C_{10}$-alkenyl, or $C_2$-$C_{10}$-alkynyl, which are unsubstituted, halogenated, or substituted with $R^x$;
  $OR^a$, $SR^a$, $C(Y)R^b$, $C(Y)OR^c$, $S(O)R^d$, $S(O)_2R^d$, $NR^eR^f$, $C(Y)NR^gR^h$;
  heterocyclyl, hetaryl, $C_3$-$C_{10}$-cycloalkyl, $C_3$-$C_{10}$-cycloalkenyl or phenyl, which are unsubstituted, or substituted with $R^y$, or $R^x$;

$R^N$ H, CN, $NO_2$;
  $C_1$-$C_{10}$-alkyl, $C_2$-$C_{10}$-alkenyl, or $C_2$-$C_{10}$-alkynyl, which are unsubstituted, halogenated, or substituted with $R^x$;
  $OR^a$, $SR^a$, $C(Y)R^b$, $C(Y)OR^c$, $S(O)R^d$, $S(O)_2R^d$, $NR^eR^f$, $C(Y)NR^gR^h$, $S(O)_mNR^eR^f$, $C(Y)NR^iNR^eR^f$, $C_1$-$C_5$-alkylen-$OR^a$, $C_1$-$C_5$-alkylen-CN, $C_1$-$C_5$-alkylen-C(Y)$R^b$, $C_1$-$C_5$-alkylen-C(Y)$OR^c$, $C_1$-$C_5$-alkylen-$NR^eR^f$, $C_1$-$C_5$-alkylen-C(Y)$NR^gR^h$, $C_1$-$C_5$-alkylen-S(O)$_mR^d$, $C_1$-$C_5$-alkylen-S(O)$_mNR^eR^f$, $C_1$-$C_5$-alkylen-$NR^iNR^eR^f$;
  heterocyclyl, hetaryl, $C_3$-$C_{10}$-cycloalkyl, $C_3$-$C_{10}$-cycloalkenyl, heterocyclyl-$C_1$-$C_5$-alkyl, hetaryl-$C_1$-$C_5$-alkyl, $C_3$-$C_{10}$-cycloalkyl-$C_1$-$C_5$-alkyl, $C_3$-$C_{10}$-cycloalkenyl-$C_1$-$C_5$-alkyl, phenyl-$C_1$-$C_5$-alkyl, or phenyl, in which groups the rings are unsubstituted, or substituted with $R^y$;

$R^a$, $R^b$, $R^c$ independently H, $C_1$-$C_4$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl; or
  heterocyclyl, heterocyclyl-$C_1$-$C_4$-alkyl, phenyl, hetaryl, phenyl-$C_1$-$C_4$-alkyl, hetaryl-$C_1$-$C_4$-alkyl, in which groups the ring is unsubstituted, or substituted with halogen, CN, $NO_2$, $C_1$-$C_4$-alkyl, $C_1$-$C_4$-haloalkyl, $C_1$-$C_4$-alkoxy, or $C_1$-$C_4$-haloalkoxy;

$R^d$ $C_1$-$C_4$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl; or
  heterocyclyl, heterocyclyl-$C_1$-$C_4$-alkyl, phenyl, hetaryl, phenyl-$C_1$-$C_4$-alkyl, and hetaryl-$C_1$-$C_4$-alkyl, in which groups the ring is unsubstituted, or substituted with halogen, CN, $NO_2$, $C_1$-$C_4$-alkyl, $C_1$-$C_4$-haloalkyl, $C_1$-$C_4$-alkoxy, or $C_1$-$C_4$-haloalkoxy;

$R^e$, $R^f$ independently H, $C_1$-$C_4$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, $C_1$-$C_4$-alkylcarbonyl, $C_1$-$C_4$-haloalkylcarbonyl, $C_1$-$C_4$-alkylsulfonyl, $C_1$-$C_4$-haloalkylsulfonyl;
  heterocyclyl, heterocyclyl-$C_1$-$C_4$-alkyl, heterocyclylcarbonyl, heterocyclylsulfonyl, phenyl, phenylcarbonyl, phenylsulfonyl, hetaryl, hetarylcarbonyl, hetarylsulfonyl, phenyl-$C_1$-$C_4$-alkyl, and hetaryl-$C_1$-$C_4$-alkyl, in which groups the ring is unsubstituted, or substituted with halogen, CN, $NO_2$, $C_1$-$C_4$-alkyl, $C_1$-$C_4$-haloalkyl, $C_1$-$C_4$-alkoxy, and $C_1$-$C_4$-haloalkoxy; or
  $R^e$ and $R^f$ are together with the nitrogen atom to which they are bound form a 5- or 6-membered, saturated, or unsaturated heterocycle, in which heterocycle none, or one ring member atom is replaced by O, S or N, and wherein the heterocycle is unsubstituted or substituted with halogen, CN, $NO_2$, $C_1$-$C_4$-alkyl, $C_1$-$C_4$-haloalkyl, $C_1$-$C_4$-alkoxy, or $C_1$-$C_4$-haloalkoxy;

$R^g$, $R^h$ independently H, $C_1$-$C_4$-alkyl, $C_1$-$C_4$-haloalkyl, $C_3$-$C_6$-cycloalkyl, $C_3$-$C_6$-halocycloalkyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl;
  heterocyclyl, heterocyclyl-$C_1$-$C_4$-alkyl, phenyl, hetaryl, phenyl-$C_1$-$C_4$-alkyl, and hetaryl-$C_1$-$C_4$-alkyl, in which groups the ring is unsubstituted, or substituted with halogen, CN, $NO_2$, $C_1$-$C_4$-alkyl, $C_1$-$C_4$-haloalkyl, $C_1$-$C_4$-alkoxy, or $C_1$-$C_4$-haloalkoxy;

$R^i$ H, $C_1$-$C_4$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl; or
  phenyl, phenyl-$C_1$-$C_4$-alkyl, in which groups the phenyl rings is unsubstituted, or substituted with halogen, CN, $NO_2$, $C_1$-$C_4$-alkyl, $C_1$-$C_4$-haloalkyl, $C_1$-$C_4$-alkoxy, or $C_1$-$C_4$-haloalkoxy;

$R^x$ CN, $NO_2$, $C_1$-$C_4$-alkoxy, $C_1$-$C_4$-haloalkoxy, $S(O)_mR^d$, $S(O)_mNR^eR^f$, $C_1$-$C_{10}$-alkylcarbonyl, $C_1$-$C_4$-haloalkylcarbonyl, $C_1$-$C_4$-alkoxycarbonyl, $C_1$-$C_4$-haloalkoxycarbonyl; or
  $C_3$-$C_6$-cycloalkyl, 5- to 7-membered heterocyclyl, 5- or 6-membered hetaryl, phenyl, $C_3$-$C_6$-cycloalkoxy, 3- to 6-membered heterocyclyloxy, phenoxy, which are unsubstituted, or substituted with $R^y$;

$R^y$ halogen, CN, $NO_2$, $C_1$-$C_4$-alkyl, $C_1$-$C_4$-haloalkyl, $C_1$-$C_4$-alkoxy, $C_1$-$C_4$-haloalkoxy, $S(O)_mR^d$, $S(O)_mNR^eR^f$, $C_1$-$C_4$-alkylcarbonyl, $C_1$-$C_4$-haloalkylcarbonyl, $C_1$-$C_4$-alkoxycarbonyl, $C_1$-$C_4$-haloalkoxycarbonyl, $C_3$-$C_6$-cycloalkyl, $C_3$-$C_6$-halocycloalkyl, $C_2$-$C_4$-alkenyl, $C_2$-$C_4$-haloalkenyl, $C_2$-$C_4$-alkynyl, or $C_1$-$C_4$-alkoxy-$C_1$-$C_4$-alkyl;

Y O or S; and m is 0, 1 or 2.

The invention also relates to a process for the preparation of the agrochemical composition comprising mixing the propylene carbonate, compounds I, and optionally an acid and/or cyclohexanone. It also relates to a method for controlling pests, which method comprises the application of the agrochemical composition, or a dilution thereof, to plants, plant propagation material, or the locus of growth of the plants; the pests or their food supply, habitat or breeding grounds. Other objects are the use of cyclohexanone and/or an acid, for stabilizing agrochemical compositions comprising compounds I; and a composition for stabilizing the agrochemical composition comprising 1 to 50 wt % of propylene carbonate, 0.1 to 10 wt % cyclohexanone, and an acid. Another object is an aqueous tank-mix composition comprising the agrochemical composition in a concentration of 0.01 wt % to 10 wt %. Combinations of embodiments with other embodiments, regardless of their respective level of preference, are within the scope of the invention.

Pesticidal compounds I and their preparation are known from WO2010/034737, WO2016/180833, and EP Appl. No. 16197196.5. Formulation of compounds I, however, is difficult due to their chemical decay over time, especially at varying temperatures. The chemical decay is even accelerated in the presence of propylene carbonate, a typical polar solvent used in soluble concentrates (SL) and emulsion concentrates (EC). Despite this unfavorable influence on the stability of the pesticidal compounds I, the use of propylene carbonate in agrochemical formulations generally has several advantages, inter alia its good toxicological and environmental profile, its high solubilizing effects, and its high solubility in water. These properties make the solvent an indispensable additive in SL- and EC-formulations.

It is therefore desirable to provide an agrochemical composition comprising compounds I and propylene carbonate, wherein the agrochemical composition has a high physical and chemical stability in particular wherein the chemical degradation of compounds I is reduced. This was achieved by an agrochemical composition comprising propylene carbonate, up to 10 wt % of water, and compounds I.

Besides the high stability, other advantages of the agrochemical composition are a high loading of the agrochemical composition with compounds I, a favorable ecotoxicological profile, and a good biological activity both of the agrochemical composition, and the tank-mix compositions comprising the agrochemical composition in diluted form.

The concentration of water in the agrochemical composition is up to 10 wt % with regard to the total weight of the agrochemical composition, preferably up to 5 wt %, more preferably up to 2 wt %, most preferably up to 0.5 wt %, and in particular up to 0.1 wt %. In one embodiment, the agrochemical composition is essentially free of water.

The concentration of propylene carbonate in the agrochemical composition may be from 0.5 to 50 wt % with regard to the total weight of the agrochemical composition, preferably 1 to 25 wt %, more preferably 5 to 20 wt %. The concentration of propylene carbonate in the agrochemical composition may be at least 5 wt %, preferably at least 10 wt %, more preferably at least 15 wt %. The concentration of propylene carbonate in the agrochemical composition may be up to 70 wt %, preferably up to 40 wt %, more preferably up to 30 wt %.

The substituents in compounds I preferably have the following meaning:
$R^1$ $CH_2CH_3$;
$R^2$ $C_1$-$C_4$-alkyl, which is unsubstituted, or halogenated;
$R^3$ H;
$R^N$ $CHR^4R^5$; wherein
  $R^4$ $C_1$-$C_4$-alkyl, which is unsubstituted, halogenated, or is substituted with 1, or 2 $R^x$, wherein $R^x$ is selected from CN and $C(O)NH_2$; or
  $C_3$-$C_6$-cycloalkyl, which is unsubstituted, or substituted with 1, 2, or 3 $R^y$, wherein $R^y$ is halogen, CN, or $C(O)NH_2$;
  $R^5$ $C_1$-$C_4$-alkyl, which is unsubstituted, halogenated, or substituted with 1, or 2 $R^x$, wherein $R^x$ is CN, or $C(O)NH_2$; or
  $C_3$-$C_6$-cycloalkyl, which is unsubstituted, or substituted with 1, 2 or 3 substituents $R^y$, wherein $R^y$ is halogen, CN or $C(O)NH_2$; or
  $R^4$ and $R^5$ together with the carbon atom to which they are attached form a 3- to 12-membered non-aromatic, saturated carbocycle, which is unsubstituted or substituted with $R^j$, wherein $R^j$ is halogen, CN, or $C(O)NH_2$.

More preferably, the substituents in compounds I have the following meaning:
$R^1$ is $CH_2CH_3$, $R^2$ is $CH_3$, $R^3$ is H, $R^N$ is $CHR^4R^5$; and wherein
a) $R^4$ is $CH_3$, $R^5$ is $CH_3$;
b) $R^4$ is $CF_3$, $R^5$ is $CH_3$;
c) $R^4$ is $CH(CH_3)_2$, $R^5$ is $CH_3$;
d) $R^4$ is $CHFCH_3$, $R^5$ is $CH_3$;
e) $R^4$ is 1-CN-$cC_3H_4$, $R^5$ is $CH_3$;
f) $R^4$ is 1-$C(O)NH_2$-$cC_3H_4$, $R^5$ is $CH_3$; or
g) $R^4$ and $R^5$ together are $CH_2CH_2CF_2CH_2CH_2$.

Most preferably, the substituents in compounds I have the following meaning:
$R^1$ is $CH_2CH_3$, $R^2$ is $CH_3$, $R^3$ is H, $R^N$ is $CHR^4R^5$; and wherein
a) $R^4$ is $CH_3$, $R^5$ is $CH_3$;
b) $R^4$ is $CF_3$, $R^5$ is $CH_3$;
c) $R^4$ is $CH(CH_3)_2$, $R^5$ is $CH_3$;
d) $R^4$ is $CHFCH_3$, $R^5$ is $CH_3$;
e) $R^4$ is 1-CN-$cC_3H_4$, $R^5$ is $CH_3$;
f) $R^4$ is 1-$C(O)NH_2$-$cC_3H_4$, $R^5$ is $CH_3$; or
g) $R^4$ and $R^5$ together are $CH_2CH_2CF_2CH_2CH_2$; and In particular, the substituents in compounds I have the following meaning:
$R^1$ is $CH_2CH_3$, $R^2$ is $CH_3$, $R^3$ is H, $R^N$ is $CH(CH_3)CH(CH_3)_2$.

Accordingly, such a particularly preferred compound I is 1-(1,2-dimethylpropyl)-N-ethyl-5-methyl-N-pyridazin-4-yl-pyrazole-4-carboxamide (Compound Ia).

Compounds I usually have a water-solubility of at least 1 g/l, preferably at least 10 g/l, most preferably at least 30 g/I at 25° C. Accordingly, the term "water-soluble" means a water-solubility of at least 1 g/l, preferably at least 10 g/l, most preferably at least 30 g/I at 25° C.

The agrochemical composition may comprise one or more pesticidal compounds falling under the definition of compounds I, in particular one pesticidal compound falling under the definition of compounds I.

The concentration of compounds I in the agrochemical composition may be in the range of 1 to 99 wt %, preferably 1 to 95 wt %, more preferably 5 to 90 wt %, most preferably 5 to 80 wt %, especially preferably 5 to 60 wt %, and in particular 10 to 40 wt % with regard to the total weight of the agrochemical composition. The concentration of compounds I in the agrochemical composition may be up to 50 wt %, preferably up to 30 wt %, and more preferably up to 20 wt % with regard to the total weight of the agrochemical composition.

The organic moieties mentioned herein for the definitions of the variables are—like the term halogen—collective terms for individual listings of the individual group members. The prefix $C_n$-$C_m$ indicates in each case the possible number of carbon atoms in the group. The term "halogen" denotes in each case F, Br, Cl, or I, especially F, Cl, or Br, and in particular Cl. The term "alkyl" as used herein and in the alkyl moieties of alkylamino, alkylcarbonyl, alkylthio, alkylsulfinyl, alkylsulfonyl and alkoxyalkyl denotes in each case a straight-chain or branched alkyl group having usually from 1 to 10 carbon atoms, frequently from 1 to 6 carbon atoms, preferably 1 to 4 carbon atoms, more preferably from 1 to 3 carbon atoms. Examples of an alkyl group are $CH_3$, $CH_3CH_2$, $CH_3CH_2CH_2$, $(CH_3)_2CH$, $CH_3CH_2CH_2CH_2$, $CH_3CH2CH(CH3)$, $(CH_3)_2CHCH_2$, $(CH_3)_3C$, n- pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. The term "haloalkyl" as used herein and in the haloalkyl moieties of haloalkylcarbonyl, haloalkoxycarbonyl, haloalkylthio, haloalkylsulfonyl, haloalkylsulfinyl, haloalkoxy and haloalkoxyalkyl, denotes in each case a straight-chain or branched alkyl group having usually from 1 to 10 carbon atoms, frequently from 1 to 6 carbon atoms, preferably from 1 to 4 carbon atoms, wherein the hydrogen atoms of this group are partially or totally replaced with halogen atoms. Preferred haloalkyl moieties are selected from $C_1$-$C_4$-haloalkyl, more preferably from $C_1$-$C_3$-haloalkyl or $C_1$-$C_2$-haloalkyl, in particular from $C_1$-$C_2$-fluoroalkyl such as $CH_2F$, $CHF_2$, $CF_3$, $CHFCH_3$, $CH_2CH_2F$, $CH_2CHF_2$, $CH_2CF_3$, $CF_2CF_3$, and the like. The term "alkoxy" as used herein denotes in each case a straight-chain or branched alkyl group which is bonded via an oxygen atom and has usually from 1 to 10 carbon atoms, frequently from 1 to 6 carbon atoms, preferably 1 to 4 carbon atoms. Examples of an alkoxy group are $CH_3O$, $CH_3CH_2O$, $CH_3CH_2CH_2O$, $(CH_3)_2CHO$, $CH_3CH_2CH_2CH_2O$, $CH_3CH_2C(CH_3)O$, $(CH_3)_2 CHCH_2O$, $(CH_3)_3C$, and the like. The term "alkoxyalkyl" as used herein refers to alkyl usually comprising 1 to 10, frequently 1 to 4, preferably 1 to 2 carbon atoms, wherein 1 carbon atom carries an alkoxy radical usually comprising 1 to 4, preferably 1 or 2 carbon atoms as defined above. Examples are $CH_3OCH_2$, $C_2H_5OCH_2$, $CH_3OCH_2CH_2$, and $CH_3CH_2OCH_2CH_2$. The term "haloalkoxy" as used herein denotes in each case a straight-chain or branched alkoxy group having from 1 to 10 carbon atoms, frequently from 1 to 6 carbon atoms, preferably 1 to 4 carbon atoms, wherein the hydrogen atoms of this group are partially or totally replaced with halogen atoms, in particular F-atoms. Preferred haloalkoxy moieties include $C_1$-$C_4$-haloalkoxy, in particular $C_1$-$C_2$-fluoroalkoxy, such as $CH_2FO$, $CHF_2O$, $CF_3O$, $CH_3CHFO$, $CH_2FCH_2O$, $CHF_2CH_2O$, $CF_3CH_2O$, $CHClFCH_2O$, $CClF_2CH_2O$, $CCl_2FCH_2O$, $CCl_3CH_2O$, $CF_3CF_2O$ and the like. The term "alkylsulfonyl" (alkyl-$S(=O)_2$—) as used herein refers to a straight-chain or branched saturated alkyl group having 1 to 10 carbon atoms, preferably 1 to 4 carbon atoms (=$C_1$-$C_4$-alkylsulfonyl), preferably 1 to 3 carbon atoms, which is bonded via the S-atom of the sulfonyl group at any position in the alkyl group. The term "haloalkylsulfonyl" as used herein refers to an alkylsulfonyl group as mentioned above wherein the hydrogen atoms are substituted with F, Cl, Br, or I. The term "alkylcarbonyl" refers to an alkyl group as defined above, which is bonded via the carbon atom of a carbonyl group (C=O) to the remainder of the molecule. The term "haloalkylcarbonyl" refers to an alkylcarbonyl group as mentioned above, wherein the hydrogen atoms are substituted with F, Cl, Br, or I. The term "alkoxycarbonyl" refers to an alkylcarbonyl group as defined above, which is bonded via an oxygen atom to the remainder of the molecule. The term "haloalkoxycarbonyl" refers to an alkoxycarbonyl group as mentioned above, wherein the hydrogen atoms are substituted with F, Cl, Br or I. The term "alkenyl" as used herein denotes in each case a singly unsaturated hydrocarbon radical having usually 2 to 10, frequently 2 to 6, preferably 2 to 4 carbon atoms, e.g. vinyl, allyl (2-propen-1-yl), 1-propen-1-yl, 2-propen-2-yl, methallyl (2-methylprop-2-en-1-yl), 2-buten-1-yl, 3-buten-1-yl, 2-penten-1-yl, 3-penten-1-yl, 4-penten-1-yl, 1-methylbut-2-en-1-yl, 2-ethylprop-2-en-1-yl and the like. The term "haloalkenyl" as used herein refers to an alkenyl group as defined above, wherein the hydrogen atoms are partially or totally replaced with halogen atoms. The term "alkynyl" as used herein denotes in each case a singly unsaturated hydrocarbon radical having usually 2 to 10, frequently 2 to 6, preferably 2 to 4 carbon atoms, e.g. ethynyl, propargyl (2-propyn-1-yl), 1-propyn-1-yl, 1-methylprop-2-yn-1-yl), 2-butyn-1-yl, 3-butyn-1-yl, 1-pentyn-1-yl, 3-pentyn-1-yl, 4-pentyn-1-yl, 1-methylbut-2-yn-1-yl, 1-ethylprop-2-yn-1-yl and the like. The term "haloalkynyl" as used herein refers to an alkynyl group as defined above, wherein the hydrogen atoms are partially or totally replaced with halogen atoms. The term "cycloalkyl" as used herein and in the cycloalkyl moieties of cycloalkoxy and cycloalkylthio denotes in each case a monocyclic cycloaliphatic radical having usually from 3 to 10 or from 3 to 6 carbon atoms, such as cyclopropyl ($cC_3H_4$), cyclobutyl, cyclopentyl, cyclohexyl, cycloheptyl, cyclooctyl, cyclononyl and cyclodecyl or cyclopropyl, cyclobutyl, cyclopentyl and cyclohexyl. The abbreviation "$cC_3H_z$" means cyclopropyl to which a number of z hydrogen atoms are bound. The term "halocycloalkyl" as used herein and in the halocycloalkyl moieties of halocycloalkoxy and halocycloalkylthio denotes in each case a monocyclic cycloaliphatic radical having usually from 3 to 10 C atoms or 3 to 6 C atoms, wherein at least one, e.g. 1, 2, 3, 4, or 5 of the hydrogen atoms, are replaced by halogen, in particular by fluorine or chlorine. Examples are 1- and 2-fluorocyclopropyl, 1,2-, 2,2- and 2,3-difluorocyclopropyl, 1,2,2-trifluorocyclopropyl, 2,2,3,3-tetrafluorocyclpropyl, 1- and 2-chlorocyclopropyl, 1,2-, 2,2- and 2,3-dichlorocyclopropyl, 1,2,2-trichlorocyclopropyl, 2,2,3,3-tetrachlorocyclpropyl, 1-,2- and 3-fluorocyclopentyl, 1,2-, 2,2-, 2,3-, 3,3-, 3,4-, 2,5-difluorocyclopentyl, 1-,2- and 3-chlorocyclopentyl, 1,2-, 2,2-, 2,3-, 3,3-, 3,4-, 2,5-dichlorocyclopentyl and the like. The term "cycloalkoxy" refers to a cycloalkyl group as defined above, which is bonded via an oxygen atom to the remainder of the molecule.

The term "cycloalkylalkyl" refers to a cycloalkyl group as defined above which is bonded via an alkyl group, such as a $C_1$-$C_5$-alkyl group or a $C_1$-$C_4$-alkyl group, in particular a methyl group (=cycloalkylmethyl), to the remainder of the molecule. The term "cycloalkenyl" as used herein and in the cycloalkenyl moieties of cycloalkenyloxy and cycloalkenylthio denotes in each case a monocyclic singly unsaturated non-aromatic radical having usually from 3 to 10, e.g. 3, or 4 or from 5 to 10 carbon atoms, preferably from 3- to 8 carbon atoms. Exemplary cycloalkenyl groups include cyclopropenyl, cycloheptenyl or cyclooctenyl. The term "halocycloalkenyl" as used herein and in the halocycloalkenyl moieties of halocycloalkenyloxy and halocycloalkenylthio denotes in each case a monocyclic singly unsaturated non-aromatic radical having usually from 3 to 10, e.g. 3, or 4 or from 5 to 10 carbon atoms, preferably from 3- to 8 carbon atoms, wherein at least one, e.g. 1, 2, 3, 4, or 5 of the hydrogen atoms, are replaced by halogen, in particular by fluorine or chlorine. Examples are 3,3-difluorocyclopropen-1-yl and 3,3-dichlorocyclopropen-1-yl. The term "cycloalkenylalkyl" refers to a cycloalkenyl group as defined above which is bonded via an alkyl group, such as a $C_1$-$C_5$-alkyl group or a $C_1$-$C_4$-alkyl group, in particular a methyl group (=cycloalkenylmethyl), to the remainder of the molecule. The term "carbocycle" or "carbocyclyl" includes in general a 3- to 12-membered, preferably a 3- to 8-membered or a 5- to 8-membered, more preferably a 5- or 6-membered monocyclic, non-aromatic ring comprising 3 to 12, preferably 3 to 8 or 5 to 8, more preferably 5 or 6 carbon atoms. Preferably, the term "carbocycle" covers cycloalkyl and cycloalkenyl groups as defined above. The term "heterocycle" or "heterocyclyl" includes in general 3- to 12-membered, preferably 3- to 8-membered or 5- to 8-membered, more preferably 5- or 6-membered, in particular 6-membered monocyclic heterocyclic non-aromatic radicals. The heterocyclic non-aromatic radicals usually comprise 1, 2, 3, 4, or 5, preferably 1, 2 or 3 heteroatoms selected from N, O and S as ring members, where S-atoms as ring members may be present as S, SO or $SO_2$. Examples of 5- or 6-membered heterocyclic radicals comprise saturated or unsaturated, non-aromatic heterocyclic rings, such as oxiranyl, oxetanyl, thietanyl, thietanyl-S-oxid (S-oxothietanyl), thietanyl-S-dioxid (S-dioxothiethanyl), pyrrolidinyl, pyrrolinyl, pyrazolinyl, tetrahydrofuranyl, dihydrofuranyl, 1,3-dioxolanyl, thiolanyl, S-oxothiolanyl, S-dioxothiolanyl, dihydrothienyl, S-oxodihydrothienyl, S-dioxodihydrothienyl, oxazolidinyl, oxazolinyl, thiazolinyl, oxathiolanyl, piperidinyl, piperazinyl, pyranyl, dihydropyranyl, tetrahydropyranyl, 1,3- and 1,4-dioxanyl, thiopyranyl, S-oxothiopyranyl, S-dioxothiopyranyl, dihydrothiopyranyl, S-oxodihydrothiopyranyl, S-dioxodihydrothiopyranyl, tetrahydrothiopyranyl, S-oxotetrahydrothiopyranyl, S-dioxotetrahydrothiopyranyl, morpholinyl, thiomorpholinyl, S-oxothiomorpholinyl, S-dioxothiomorpholinyl, thiazinyl and the like. Examples for heterocyclic ring also comprising 1 or 2 carbonyl groups as ring members comprise pyrrolidin-2-onyl, pyrrolidin-2,5-dionyl, imidazolidin-2-onyl, oxazolidin-2-onyl, thiazolidin-2-onyl and the like. The term "hetaryl" includes monocyclic 5- or 6-membered heteroaromatic radicals comprising as ring members 1, 2, 3, or 4 heteroatoms selected from N, O and S. Examples of 5- or 6-membered heteroaromatic radicals include pyridyl, i.e. 2-, 3-, or 4-pyridyl, pyrimidinyl, i.e. 2-, 4-, or 5-pyrimidinyl, pyrazinyl, pyridazinyl, i.e. 3- or 4-pyridazinyl, thienyl, i.e. 2- or 3-thienyl, furyl, i.e. 2- or 3-furyl, pyrrolyl, i.e. 2- or 3-pyrrolyl, oxazolyl, i.e. 2-, 3-, or 5-oxazolyl, isoxazolyl, i.e. 3-, 4-, or 5-isoxazolyl, thiazolyl, i.e. 2-, 3- or 5-thiazolyl, isothiazolyl, i.e. 3-, 4-, or 5-isothiazolyl, pyrazolyl, i.e. 1-, 3-, 4-, or 5-pyrazolyl, i.e. 1-, 2-, 4-, or 5-imidazolyl, oxadiazolyl, e.g. 2- or 5-[1,3,4]oxadiazolyl, 4- or 5-(1,2,3-oxadiazol)yl, 3- or 5-(1,2,4-oxadiazol)yl, 2- or 5-(1,3,4-thiadiazol)yl, thiadiazolyl, e.g. 2- or 5-(1,3,4-thiadiazol)yl, 4- or 5-(1,2,3-thiadiazol)yl, 3- or 5-(1,2,4-thiadiazol)yl, triazolyl, e.g. 1H-, 2H- or 3H-1,2,3-triazol-4-yl, 2H-triazol-3-yl, 1H-, 2H-, or 4H-1,2,4-triazolyl and tetrazolyl, i.e. 1H- or 2H-tetrazolyl. The term "hetaryl" also includes bicyclic 8 to 10-membered heteroaromatic radicals comprising as ring members 1, 2 or 3 heteroatoms selected from N, O and S, wherein a 5- or 6-membered heteroaromatic ring is fused to a phenyl ring or to a 5- or 6-membered heteroaromatic radical. Examples of a 5- or 6-membered heteroaromatic ring fused to a phenyl ring or to a 5- or 6-membered heteroaromatic radical include benzofuranyl, benzothienyl, indolyl, indazolyl, benzimidazolyl, benzoxathiazolyl, benzoxadiazolyl, benzothiadiazolyl, benzoxazinyl, chinolinyl, isochinolinyl, purinyl, 1,8-naphthyridyl, pteridyl, pyrido[3,2-d]pyrimidyl or pyridoimidazolyl and the like. These fused hetaryl radicals may be bonded to the remainder of the molecule via any ring atom of 5- or 6-membered heteroaromatic ring or via a carbon atom of the fused phenyl moiety. The term "aryl" includes mono-, bi- or tricyclic aromatic radicals having usually from 6 to 14, preferably 6, 10, or 14 carbon atoms. Exemplary aryl groups include phenyl, naphthyl and anthracenyl. Phenyl is preferred as aryl group. The terms "heterocyclyloxy", "hetaryloxy", and "phenoxy" refer to heterocyclyl, hetaryl, and phenyl, which are bonded via an oxygen atom to the remainder of the molecule. The terms "heterocyclylsulfonyl", "hetarylsulfonyl", and "phenylsulfonyl" refer to heterocyclyl, hetaryl, and phenyl, respectively, which are bonded via the sulfur atom of a sulfonyl group to the remainder of the molecule. The terms "heterocyclylcarbonyl", "hetarylcarbonyl", and "phenylcarbonyl" refer to heterocyclyl, hetaryl, and phenyl, respectively, which are bonded via the carbon atom of a carbonyl group (C=O) to the remainder of the molecule. The terms "heterocyclylalkyl" and "hetarylalkyl" refer to heterocyclyl or hetaryl, respectively, as defined above which are bonded via a $C_1$-$C_5$-alkyl group or a $C_1$-$C_4$-alkyl group, in particular a methyl group (=heterocyclylmethyl or hetarylmethyl), to the remainder of the molecule. The term "phenylalkyl" refers to phenyl which is bonded via a $C_1$-$C_5$-alkyl group or a $C_1$-$C_4$-alkyl group, in particular a methyl group (=arylmethyl or phenylmethyl), to the remainder of the molecule, examples including benzyl, 1-phenylethyl, 2-phenylethyl, etc. The terms "alkylene" refers to alkyl as defined above, which represents a linker between molecule and a substituent. The term "substituted" refers in each case to a substitution by one, or more, same or different substituents. The term "halogenated" refers to a partial, of complete substitution with halogen.

The term "stabilizing" usually refers to a chemical or physical stabilization of compounds I, in particular a chemical stabilization Compounds I may be present in the form of salts. Such salts will typically be obtained by reacting the compound with an acid, if the compound has a basic functionality such as an amine, or by reacting the compounds with a base, if the compound has an acidic functionality such as a carboxylic acid group. Cations, which stem from a base, with which the compounds of the present invention are reacted, are e.g. alkali metal cations $M_a^+$, alkaline earth metal cations $M_{ea}^{2+}$ or ammonium cations $NR_4^+$, wherein the alkali metals are preferably sodium, potassium or lithium and the alkaline earth metal cations are preferably magnesium or calcium, and wherein the substituents R of the ammonium cation $NR_4^+$ are preferably independently selected from H, $C_1$-$C_{10}$-alkyl, phenyl and phenyl-$C_1$-$C_2$-alkyl. Suitable cations are in particular the ions of the alkali metals, preferably lithium, sodium and potassium, of the alkaline earth metals, preferably calcium, magnesium and barium, and of the transition metals, preferably manganese, copper, zinc and iron, and also ammonium ($NH_4^+$) and substituted ammonium in which one to four of the hydrogen atoms are replaced by $C_1$-$C_4$-alkyl, $C_1$-$C_4$-hydroxyalkyl, $C_1$-$C_4$-alkoxy, $C_1$-$C_4$-alkoxy-$C_1$-$C_4$-alkyl, hydroxy-$C_1$-$C_4$-alkoxy-$C_1$-$C_4$-alkyl, phenyl or benzyl. Examples of substituted ammonium ions comprise methylammonium, isopropylammonium, dimethylammonium, diisopropylammonium, trimethylammonium, tetramethylammonium, tetraethylammonium, tetrabutylammonium, 2-hydroxyethylammonium, 2-(2-hydroxyethoxy)ethylammonium, bis(2-hydroxyethyl)ammonium, benzyltrimethylammonium and benzl-triethylammonium, furthermore phosphonium ions, sulfonium ions, preferably tri($C_1$-$C_4$-alkyl)sulfonium, and sulfoxonium ions, preferably tri($C_1$-$C_4$-alkyl)sulfoxonium. Anions, which stem from an acid, with which the compounds of the present invention have been reacted, are e.g. chloride, bromide, fluoride, hydrogensulfate, sulfate, dihydrogenphosphate, hydrogenphosphate, phosphate, nitrate, bicarbonate, carbonate, hexafluorosilicate, hexafluorophosphate, benzoate, and the anions of $C_1$-$C_4$-alkanoic acids, preferably formate, acetate, propionate and butyrate. Tautomers of the compounds of the present invention include keto-enol tautomers, imine-enamine tautomers, amide-imidic acid tautomers and the like. The compounds of the present invention cover every possible tautomer. The term "N-oxide" relates to a form of the compounds of the present invention in which at least one nitrogen atom is present in oxidized form (as NO). N-oxides of the compounds of the present invention can only be obtained, if the compounds contain a nitrogen atom, which may be oxidized. N-oxides may principally be prepared by standard methods, e.g. by the method described in Journal of Organometallic Chemistry 1989, 370, 17-31. However, it is preferred according to the invention that the compounds are not present in the form of N-oxides. On the other hand, under certain reaction conditions, it cannot be avoided that N-oxides are formed at least intermediary. The term "stereoisomers" encompasses both optical isomers, such as enantiomers or diastereomers, the latter existing due to more than one centre of chirality in the molecule, as well as geometrical isomers (cis/trans isomers). Depending on the substitution pattern, the compounds of the present invention may have one or more centres of chirality, in which case they may be present as mixtures of enantiomers or diastereomers. The term Compounds I comprises both the pure enantiomers or diastereomers of Compounds I and their mixtures. Suitable compounds of the invention also include all possible geometrical stereoisomers (cis/trans isomers) and mixtures thereof.

It was also found that the advantages of the agrochemical composition described above, in particular the chemical stability of compounds I, are even more pronounced if the acidity of the agrochemical composition is increased. The acidity of the agrochemical composition may be assessed by measuring the pH of an aqueous dilution of the agrochemical composition.

It has been found that it is particularly advantageous if the pH of a 1% dilution of the agrochemical composition in deionized water is from 2 to 6, preferably 4 to 6, most preferably 4.5 to 5.5. The pH of a 1% dilution of the agrochemical composition in deionized water may be at least 3, preferably at least 5. In a particularly preferred embodiment, the pH of a 1% dilution of the agrochemical composition in deionized water is approximately 5.5. The expression 1% dilution in deionized water refers to the dilution of 10 g of the agrochemical composition in 990 g deionized water.

The acidity of the agrochemical composition may be adapted by either adding an acid, or by applying an adduct salt of compounds I with an acid instead of utilizing the free base of compounds I.

The acid in both cases may be an inorganic acid, e.g. HF, HCl, HBr, or $H_2SO_4$; or an organic acid, preferably a carboxylic acid, e.g. formic acid, acetic acid, propionic acid, oxalic acid, citric acid, trifluoroacetic acid, trichloroacetic acid, or benzoic acid; or a sulfonic acid, e.g. toluene sulphonic acid, benzene sulphonic acid, naphthalene sulfonic acid, camphor sulphonic acid. In case the acid is added to the agrochemical composition, the acid is preferably an organic acid, more preferably a carboxylic acid, most preferably acetic acid. In case the acidity of the agrochemical composition is adapted by applying an adduct salt of compounds I with an acid, the acid is preferably an inorganic acid, in particular HCl.

The $pK_a$ of the acid may be in the range from 3 to 6, preferably 4 to 6, more preferably 4 to 5.5, in particular 4.5 to 5.5. In one embodiment, the $pK_a$ is approximately 4.8. The logarithmic acid dissociation constant $pK_a$ is an inherent chemical constant that is either known to the skilled person from standard text books, or can be determined by half-titration of a given amount of the acid and measurement of the corresponding pH-value according to the Henderson-Hasselbalch equation.

The concentration of the acid in the agrochemical composition may be adapted to arrive at the desired acidity. Typically, the concentration may range from 0.1 to 10 wt %, preferably from 0.5 to 5 wt %, most preferably from 1 to 5 wt % with regard to the total weight of the agrochemical composition.

It was furthermore found that the addition of a cyclohexanone to the agrochemical composition also enhances the advantages described above, in particular the chemical stability of compounds I. The concentration of cyclohexanone may be from 0.1 to 30 wt %, preferably 0.5 to 20 wt %, most preferably 1 to 5 wt %, and in particular 1 to 3 wt % with regard to the total weight of the formulation. The concentration of cyclohexanone may be at least 1.5 wt %, preferably at least 2 wt % with regard to the total weight of the formulation. The concentration of cyclohexanone may be up to 15 wt %, preferably up to 10 wt %, most preferably up to 4 wt % with regard to the total weight of the agrochemical composition.

In one embodiment, the agrochemical composition comprises
A) 1 to 25 wt % of propylene carbonate;
B) up to 5 wt % of water; and
C) 1 to 95 wt % of compounds I.

In another embodiment, the agrochemical composition comprises
A) 5 to 20 wt % of propylene carbonate;
B) up to 2 wt % of water; and
C) 1 to 90 wt % of compounds I.

In another embodiment, the agrochemical composition comprises
A) 5 to 20 wt % of propylene carbonate;
B) up to 1 wt % of water;
C) 1 to 30 wt % of compounds I; and
D) 0.5 to 20 wt % of cyclohexanone.

In another embodiment, the agrochemical composition comprises
A) 5 to 20 wt % of propylene carbonate;
B) up to 1 wt % of water;
C) 1 to 30 wt % of compounds I;
D) 0.5 to 20 wt % of cyclohexanone; and
E) an acid with a $pK_a$ in the range from 4 to 5.5 in an amount that is chosen such that a 1% dilution of the agrochemical composition in deionized water has a pH of 4 to 6.

In another embodiment, the agrochemical composition comprises
A) 5 to 20 wt % of propylene carbonate;
B) up to 1 wt % of water;
C) 1 to 30 wt % of compounds I;
D) 0.5 to 20 wt % of cyclohexanone; and
E) acetic acid in an amount that is chosen such that a 1% dilution of the agrochemical composition in deionized water has a pH of 4 to 6.

In another embodiment, the agrochemical composition comprises
A) 5 to 20 wt % of propylene carbonate;
B) up to 1 wt % of water, preferably essentially free of water;
C) 1 to 30 wt % of compounds I;
D) 0.5 to 20 wt % of cyclohexanone; and
E) 1 to 5 wt % of acetic acid.

The agrochemical composition is prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries that may be included in the agrochemical composition are solvents, liquid carriers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzyl alcohol, cyclohexanol; glycols; DMSO; ketones, e.g. esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulphates, phosphates, carboxylates, and mixtures thereof. Examples of sulfonates are alkylarylsulfonates, diphenylsulfonates, alpha-olefin sulfonates, lignin sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulphates are sulphates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable non-ionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinyl alcohols, or vinyl acetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinyl amines or polyethylene amines.

Suitable adjuvants are compounds, which have a negligible or even no pesticidal activity themselves, and which improve the biological performance of the compound I on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), inorganic clays (organically modified or unmodified), polycarboxylates, and silicates. Suitable bactericides are bronopol and isothiazolinone derivatives such as alkylisothiazolinones and benzisothiazolinones. Suitable anti-freezing agents are ethylene glycol, propylene glycol, urea and glycerin. Suitable anti-foaming agents are silicones, long chain alcohols, and salts of fatty acids. Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants). Suitable tackifiers or binders are polyvinylpyrrolidons, polyvinylacetates, polyvinyl alcohols, polyacrylates, biological or synthetic waxes, and cellulose ethers.

The agrochemical composition is typically a water-soluble concentrate (SL, LS), comprising 5-15 wt % of a wetting agent (e.g. alcohol alkoxylates). For the application methods described herein, the water-soluble concentrate may be diluted with water and/or a water-soluble solvent (e.g. alcohols) ad 100 wt %. The agrochemical composition in form of a water-soluble concentrate usually dissolves upon dilution with water. The final concentration of compounds I after dilution, e.g. in a tank-mix, may be from 1 to 10,000 ppm, preferably from 5 to 5,000 ppm, more preferably from 10 to 1000 ppm, and in particular from 50 to 500 ppm.

The agrochemical composition may also be an emulsifiable concentrate (EC) comprising 5-10 wt % of emulsifiers (e.g. calcium dodecyl benzenesulfonate and castor oil ethoxylate), wherein all components of the composition are dissolved in water-insoluble organic solvent (e.g. aromatic hydrocarbon) ad 100 wt %. Dilution with water gives an emulsion.

The SL- or EC-formulations may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 1 and 95%, preferably between 1 and 90%, and in particular between 5 and 75%, by weight of the sum of compounds I and further pesticides. Compounds I and the further pesticides are employed in a purity of from 90% to 100%, preferably from 95% to 100% (according to NMR spectrum).

Solutions for seed treatment (LS) and EC-formulations are usually employed for the purposes of treatment of plant propagation materials, particularly seeds. The compositions in question give, after two-to-tenfold dilution, active substance concentrations (i.e. the sum of compounds I and further pesticides) of from 0.01 to 60% by weight, preferably from 0.1 to 40% by weight, in the ready-to-use preparations. Application can be carried out before or during sowing. Methods for applying the compositions on to plant propagation material, especially seeds include dressing, coating, pelleting, dusting, soaking and in-furrow application methods of the propagation material. Preferably, the composition is applied on to the plant propagation material by a method such that germination is not induced, e. g. by seed dressing, pelleting, coating and dusting.

When employed in plant protection, the amounts of compounds I applied are, depending on the kind of effect desired, from 0.001 to 2 kg per ha, preferably from 0.005 to 2 kg per ha, more preferably from 0.05 to 0.9 kg per ha, and in particular from 0.1 to 0.75 kg per ha.

In treatment of plant propagation materials such as seeds, e. g. by dusting, coating or drenching seed, amounts of compounds I of from 0.1 to 1000 g, preferably from 1 to 1000 g, more preferably from 1 to 100 g and most preferably from 5 to 100 g, per 100 kilogram of plant propagation material (preferably seeds) are generally required. When used in the protection of materials or stored products, the amount of compounds I applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and further pesticides (e.g. herbicides, insecticides, fungicides, growth regulators, safeners) may be added to the agrochemical composition as premix or, if appropriate not until immediately prior to use (tank mix). These agents can be admixed with the compositions according to the invention in a weight ratio of 1:100 to 100:1, preferably 1:10 to 10:1.

Suitable further pesticides are usually water-soluble pesticides. Water-soluble pesticides usually refers to a water-solubility of at least 0.1 g/l at 20° C., preferably at least 1 g/l, and most preferably at least 10 g/.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

Individual components of the agrochemical composition according to the invention such as parts of a kit or parts of a binary or ternary mixture may be mixed by the user himself in a spray tank and further auxiliaries may be added, if appropriate.

Accordingly, the invention also relates to a composition for stabilizing compounds I, comprising 1 to 50 wt % of propylene carbonate, 0.1 to 10 wt % cyclohexanone, and an acid.

The composition for stabilizing compounds I usually does not contain compounds I, but may be used to prepare the agrochemical composition comprising compounds I. The composition for stabilizing compounds I may be added to compounds I for manufacturing the agrochemical composition, or may be added to a tank-mix prior to application.

The composition for stabilizing compounds I may contain the same auxiliaries as described above for the agrochemical composition. The concentration of propylene carbonate in the composition for stabilizing compounds I ranges from 1 to 50 wt %, preferably 2 to 40 wt %, most preferably 5 to 30 wt %, and in particular 10 to 30 wt % with regard to the total weight of the composition for stabilizing compounds I. The concentration of propylene carbonate in the composition for stabilizing compounds I may be at least 15 wt %, preferably at least 20 wt % with regard to the total weight of the composition for stabilizing compounds I.

The concentration of cyclohexanone in the composition for stabilizing compounds I may range from 0.1 to 10 wt % of cyclohexanone, preferably 1 to 8 wt %, more preferably 2 to 5 wt % cyclohexanone with regard to the total weight of the composition for stabilizing compounds I. The concentration of cyclohexanone in the composition for stabilizing compounds I may be at least 5 wt %, preferably at least 8 wt % with regard to the total weight of the composition for stabilizing compounds I.

The pH of a 1% dilution of the composition for stabilizing compounds I in deionized water is usually from 2 to 6, preferably 3 to 6, more preferably 4 to 6. The pH of a 1% dilution of the composition for stabilizing compounds I in deionized water may be at least 3, more preferably at least 5.

The composition for stabilizing compounds I comprises an acid. The $pK_a$ of the acid may be in the range from 3 to 6, preferably 4 to 6, in particular 4.5 to 5.5. In one embodiment, the $pK_a$ is approximately 4.8.

The acid may be an inorganic acid, e.g. HF, HCl, HBr, or $H_2SO_4$; or an organic acid, preferably a carboxylic acid, e.g. formic acid, acetic acid, propionic acid, oxalic acid, citric acid, trifluoroacetic acid, trichloroacetic acid, or benzoic acid; or a sulfonic acid, e.g. toluene sulphonic acid, benzene sulphonic acid, naphthalene sulfonic acid, camphor sulphonic acid. More preferably, the acid is an organic acid. In one embodiment, the acid is a carboxylic acid, most preferably acetic acid. In another embodiment, the acid is a sulfonic acid, such as an aromatic sulfonic acid.

The concentration of the acetic acid in the composition for stabilizing compounds I may be adapted to arrive at the desired acidity. Typically, the concentration may range from 0.1 to 10 wt %, preferably from 0.5 to 5 wt %, most preferably from 0.1 to 1 wt % with regard to the total weight of the composition for stabilizing compounds I.

The invention also relates to the use of cyclohexanone and/or an acid, for stabilizing compositions comprising compounds I.

The $pK_a$ of the acid may be in the range from 3 to 6, preferably 4 to 6, in particular 4.5 to 5.5. In one embodiment, the $pK_a$ is approximately 4.8.

The acid may be an inorganic acid, e.g. HF, HCl, HBr, or $H_2SO_4$; or an organic acid, preferably a carboxylic acid, e.g. formic acid, acetic acid, propionic acid, oxalic acid, citric acid, trifluoroacetic acid, trichloroacetic acid, or benzoic acid; or a sulfonic acid, e.g. toluene sulphonic acid, benzene sulphonic acid, naphthalene sulfonic acid, camphor sulphonic acid. More preferably, the acid is an organic acid. In one embodiment, the acid is a carboxylic acid, most preferably acetic acid. In another embodiment, the acid is a sulfonic acid, such as an aromatic sulfonic acid.

The invention also relates to an aqueous tank mix composition comprising the agrochemical composition in a concentration of 0.01 wt % to 10 wt % with regard to the total weight of the tank mix.

Usually the aqueous tank-mix composition comprises at least 10 wt % of water, preferably at least 50 wt % of water, and in particular at least 80 wt % of water with regard to the total weight of the tank-mix composition. The tank mix is typically produced by pouring the agrochemical composition into water.

The aqueous tank-mix composition may comprise various types of oils, wetters, adjuvants, fertilizer, or micronutrients, and further pesticides (e.g. herbicides, insecticides, fungicides, growth regulators, safeners), which may be added either as components of the agrochemical composition, or which may be added directly to the tank-mix.

The following examples illustrate the invention

EXAMPLES

The following ingredients were used for preparing the agrochemical compositions of the examples
Acid A: $C_{10}$-$C_{16}$-alkyl benzene sulfonic acid.
Surfactant A: $C_{12}$-$C_{18}$-alcohol, ethoxylated and propoxylated.
Surfactant B: 2,4,6-Tri-(1-phenylethyl)-phenol polyethylene glycol, 10 ethylene glycol units per molecule.
Solvent A: Liquid block copolymer of polypropylene glycol and polyethylene glycol, HLB 12-18.
Solvent B: Polyethylene glycol solvent, liquid, mass average molar mass 400 g/mol, melting point 0° C.
Solvent C: Liquid polyoxyethylene-polyoxypropylene block copolymer, mass average molar weight 2500 g/mol, cloud point 22-26° C., viscosity 450 cps at 25° C., HLB 1-7.
Cosolvent A: hydrocarbon solvent with aromatic content >99%, initial boiling point 231° C.
Cosolvent B: $C_8$-$C_{10}$ fatty acid amides with dimethyl amine Example-I A soluble concentrate SL-1 containing the ingredients of Table I was prepared. To this end, propylene carbonate, propylene glycol, Surfactant A, and cyclohexanone were mixed. Surfactant B and Compound Ia were then added and the composition was mixed again. Subsequently, melted Solvent A was added to the mixture while agitating. The composition was stirred until Compound Ia had completely dissolved.

TABLE I

| Ingredients of SL-1 | |
|---|---|
| Compound Ia | 11.36 wt % |
| Propylene carbonate | 17.06 wt % |
| Cyclohexanone | 1.9 wt % |

TABLE I-continued

| Ingredients of SL-1 | |
|---|---|
| Surfactant A | 28.44 wt % |
| Surfactant B | 4.74 wt % |
| Propylene Glycol | 15.17 wt % |
| Solvent A | To 100 wt % |

Example-II

The soluble concentrates SL-2 to SL-7 were produced with the same ingredients as SL-1, with the only exception that cyclohexanone was substituted by the cosolvents of Table II at a concentration of 1.9 wt % compared to the total weight of the soluble concentrate.

TABLE II

| Cosolvents applied in SL-2 to SL-7 instead of cyclohexanone in SL-1 | | | | | | |
|---|---|---|---|---|---|---|
| | SL-2 | SL-3 | SL-4 | SL-5 | SL-6 | SL-7 |
| Cosolvent | Solvent A | Cosolvent A | Benzyl alcohol | Acetophenone | Cosolvent B | 2-Heptanone |

Example-III

Samples of the above soluble concentrates SL-1 to SL-7 were stored at a temperature of 65° C. for two weeks. The content of Compound Ia was measured before and after storage in each sample by gas chromatography. For analysis, the retardation time of Compound Ia was determined by a blank measurement. Then the samples before and after storage were measured and the integral of those peaks assigned to Compound Ia were put into relation. Table III showed the percentage of degraded Compound Ia during the storage experiment.

TABLE III

| Percentage of degraded Compound Ia in Example-III | | |
|---|---|---|
| Sample | Cosolvent | Degraded Compound Ia (in %) |
| SL-1 | Cyclohexanone | 7.96% |
| SL-2 | Solvent A | 9.39% |
| SL-3 | Cosolvent A | 12.94% |
| SL-4 | Benzyl alcohol | 11% |
| SL-5 | Acetophenone | 10.04% |
| SL-6 | Cosolvent B | 9.72% |
| SL-7 | 2-Heptanone | 9.51% |

Example-IV

A soluble concentrate SL-8 containing the ingredients of Table IV was prepared. To this end, propylene carbonate, propylene glycol, Surfactant A, and cyclohexanone were mixed. Glacial acetic acid was then added, followed by Surfactant B and Compound Ia. The obtained composition was mixed. Subsequently, melted Solvent A was added while agitating. The composition was stirred until Compound Ia had completely dissolved. The pH of SL-8, measured at a 1% dilution of SL-8 in deionized water was 4.75.

TABLE IV

| Ingredients of SL-8 | |
|---|---|
| Compound Ia | 11.36 wt % |
| Propylene carbonate | 17.06 wt % |
| Cyclohexanone | 1.9 wt % |
| Surfactant A | 28.44 wt % |
| Surfactant B | 4.74 wt % |
| Propylene Glycol | 15.17 wt % |
| Acetic acid | 0.1 wt % |
| Solvent A | To 100 wt % |

Example-V

The soluble concentrate SL-9 was produced with the same ingredients as SL-8, with the only exception that the acetic acid was substituted by Acid A at a concentration of 0.17 wt %. The pH of SL-9, measured at a 1% dilution of SL-9 in deionized water was 4.75.

Example-VI

Samples of the above soluble concentrates SL-2, SL-8, and SL-9 were stored at a temperature of 45° C. for twelve weeks. The content of Compound Ia was measured before and after storage in each sample by gas chromatography. For analysis, the retardation time of Compound Ia was determined by a blank measurement. Then the samples before and after storage were measured and the integral of those peaks assigned to Compound Ia were put into relation. Table V showed the percentage of degraded Compound Ia during the storage experiment.

TABLE V

| Percentage of degraded Compound Ia in Example-IV | | |
|---|---|---|
| Sample | Acid | Degraded Compound Ia (in %) |
| SL-2 | — | 3.72% |
| SL-8 | Acetic acid | 1.26% |
| SL-9 | Acid A | 2.34% |

Example-VII

Soluble concentrates SL-10 to SL-17 were produced in analogy to Example IV with different contents of acetic acid in a range of 0.0 to 0.4 wt % to arrive at a pH of the soluble concentrate as listed in Table VI, wherein the pH was measured of a 1% dilution of the soluble concentrate in deionized water.

TABLE VI

| pH of soluble concentrates measured in a 1% dilution in deionized water | | | | | | | |
|---|---|---|---|---|---|---|---|
| SL-10 | SL-11 | SL-12 | SL-13 | SL-14 | SL-15 | SL-16 | SL-17 |
| pH 4.5 | 4.7 | 5 | 5.1 | 5.15 | 5.75 | 6 | 6.6 |

Example-VIII

The degradation of Compound Ia was measured for SL-10 to SL-17 as in Example-III. The results were summarized in Table VII

TABLE VII

| Degradation of Compound Ia in soluble concentrates SL-10 to SL-17 | | |
|---|---|---|
| Sample | pH (of a 1% dilution in deionized water) | Degraded Compound Ia (in %) |
| SL-10 | 4.5 | 4.7 |
| SL-11 | 4.7 | 4.5 |
| SL-12 | 5 | 4.7 |
| SL-13 | 5.1 | 4.8 |
| SL-14 | 5.15 | 3.7 |
| SL-15 | 5.75 | 5.5 |
| SL-16 | 6 | 6 |
| SL-17 | 6.6 | 13.7 |

Example-IX

A soluble concentrate SL-18 containing the ingredients of Table VIII was prepared. To this end, propylene carbonate, propylene glycol, Surfactant A, and cyclohexanone were mixed. Glacial acetic acid was then added, followed by Surfactant B and Compound Ia. The obtained composition was mixed. Subsequently, Solvent B was added while agitating. The composition was stirred until Compound Ia had completely dissolved. The pH of SL-18, measured at a 1% dilution of SL-18 in deionized water was 4.83.

TABLE VIII

| Ingredients of SL-18 | |
|---|---|
| Compound Ia | 10.80 wt % |
| Propylene carbonate | 17.10 wt % |
| Cyclohexanone | 1.91 wt % |
| Surfactant A | 1.01 wt % |
| Surfactant B | 4.5 wt % |
| Solvent C | 4.95 wt % |
| Propylene Glycol | 15.75 wt % |
| Acetic acid | 0.1 wt % |
| Solvent B | To 100 wt % |

Example-X

Samples of the above soluble concentrate SL-18 were stored at a temperature of either 0° C., 25° C., 40° C., or 50° C. for 2 weeks, or 3 months. Additionally, a sample of SL-18 was stored at alternating temperatures of −10° C. and 10° C. for 2 weeks, or 3 months. The content of Compound Ia was measured after storage in each sample by gas chromatography. For analysis, the retardation time of Compound Ia was determined by a blank measurement. Then the samples after storage were measured and the integral of those peaks assigned to Compound Ia were put in relation to the corresponding peak integrals in a sample stored at −10° C. for the same time interval. Table IX showed the percentage of degraded Compound Ia during the storage experiment

TABLE IX

| Chemical degradation of Compound Ia in soluble concentrate SL-18 at different storage temperatures and intervals. | | | | | |
|---|---|---|---|---|---|
| | Storage Temperature | | | | |
| Storage Interval | 0° C. | Alternating (−10° C. to 10° C.) | 25° C. | 40° C. | 54° C. |
| 2 Weeks | 0% | 0% | 0% | 0% | 0% |
| 3 Months | 0% | 0% | 0% | 0.57% | — |

Example-XI

Samples of the above soluble concentrate SL-18 were stored at a temperature of either −10° C., 0° C., 25° C., or 40° C. for 3 months, or at 54° C. for 2 weeks. Additionally, a sample of SL-18 was stored at alternating temperatures of −10° C. and 10° C. for 3 months. The physical stability of SL-18 was assessed before and after storage by measurement of the density, the dynamic viscosity, and the pH of a 1% dilution of SL18 in deionized water. Furthermore, crystal formation, and phase separation were visually assessed. Table X summarized the results of these physical stability tests.

TABLE X

Physical Stability testing of SL-18 at different temperatures.

| Property | Initial | −10° C. | 0° C. | Alternating (−10 to 10° C.) | 25° C. | 40° C. | 54° C. (2 weeks storage) |
|---|---|---|---|---|---|---|---|
| Density (g/ml) | 1.112 | 1.112 | 1.112 | 1.112 | 1.112 | 1.112 | 1.111 |
| Viscosity (mPas) | 76.7 | 75.0 | 77.7 | 78.7 | 78.7 | 77.6 | — |
| pH | 4.83 | 5.04 | 5.00 | 5.07 | 5.09 | 5.24 | 4.93 |
| Crystal Formation | No | No | No | No | No | No | No |
| Phase Separation | No | No | No | No | No | No | No |

The invention claimed is:
1. An agrochemical composition comprising
a) propylene carbonate
b) up to 10 wt % of water based on the total weight of the composition;
c) compound (I)

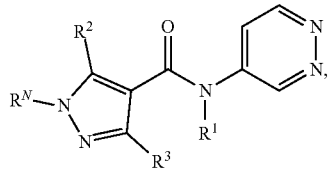

(I)

or a salt, a tautomer, or an enantiomer thereof; and
d) cyclohexanone;
wherein the variables have the meaning
$R^1$ H, $C_1$-$C_2$-alkyl, or $C_1$-$C_2$-alkoxy-$C_1$-$C_2$-alkyl;
$R^2$ H, halogen, CN, or $NO_2$;
  $C_1$-$C_{10}$-alkyl, $C_2$-$C_{10}$-alkenyl, or $C_2$-$C_{10}$-alkynyl, which are unsubstituted, halogenated, or substituted with $R^x$;
  $OR^a$, $SR^a$, $C(Y)R^b$, $C(Y)OR^c$, $S(O)R^d$, $S(O)_2R^d$, $NR^eR^f$, $C(Y)NR^gR^h$; heterocyclyl, hetaryl, $C_3$-$C_{10}$-cycloalkyl, $C_3$-$C_{10}$-cycloalkenyl, or phenyl, which are unsubstituted, or substituted with $R^y$, or $R^x$;
$R^3$ H, halogen, CN, $NO_2$;
  $C_1$-$C_{10}$-alkyl, $C_2$-$C_{10}$-alkenyl, or $C_2$-$C_{10}$-alkynyl, which are unsubstituted, halogenated, or substituted with $R^x$;
  $OR^a$, $SR^a$, $C(Y)R^b$, $C(Y)OR^c$, $S(O)R^d$, $S(O)_2R^d$, $NR^eR^f$, $C(Y)NR^gR^h$; heterocyclyl, hetaryl, $C_3$-$C_{10}$-cycloalkyl, $C_3$-$C_{10}$-cycloalkenyl or phenyl, which are unsubstituted, or substituted with $R^y$, or $R^x$;
$R^N$ H, CN, $NO_2$;
  $C_1$-$C_{10}$-alkyl, $C_2$-$C_{10}$-alkenyl, or $C_2$-$C_{10}$-alkynyl, which are unsubstituted, halogenated, or substituted with $R^x$;
  $OR^a$, $SR^a$, $C(Y)R^b$, $C(Y)OR^c$, $S(O)R^d$, $S(O)_2R^d$, $NR^eR^f$, $C(Y)NR^gR^h$, $S(O)_mNR^eR^f$, $C(Y)NR^iNR^eR^f$, $C_1$-$C_5$-alkylen-$OR^a$, $C_1$-$C_5$-alkylen-CN, $C_1$-$C_5$-alkylen-$C(Y)R^b$, $C_1$-$C_5$-alkylen-$C(Y)OR^c$, $C_1$-$C_5$-alkylen-$NR^eR^f$, $C_1$-$C_5$-alkylen-$C(Y)NR^gR^h$, $C_1$-$C_5$-alkylen-$S(O)_mR^d$, $C_1$-$C_5$-alkylen-$S(O)_mNR^eR^f$, $C_1$-$C_5$-alkylen-$NR^iNR^eR^f$; heterocyclyl, hetaryl, $C_3$-$C_{10}$-cycloalkyl, $C_3$-$C_{10}$-cycloalkenyl, heterocyclyl-$C_1$-$C_5$-alkyl, hetaryl-$C_1$-$C_5$-alkyl, $C_3$-$C_{10}$-cycloalkyl-$C_1$-$C_5$-alkyl, $C_3$-$C_{10}$-cycloalkenyl-$C_1$-$C_5$-alkyl, phenyl-$C_1$-$C_5$-alkyl, or phenyl, in which groups the rings are unsubstituted, or substituted with $R^y$;
$R^a$, $R^b$, $R^c$ independently H, $C_1$-$C_4$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl; or heterocyclyl, heterocyclyl-$C_1$-$C_4$-alkyl, phenyl, hetaryl, phenyl-$C_1$-$C_4$-alkyl, hetaryl-$C_1$-$C_4$-alkyl, in which groups the ring is unsubstituted, or substituted with halogen, CN, $NO_2$, $C_1$-$C_4$-alkyl, $C_1$-$C_4$-haloalkyl, $C_1$-$C_4$-alkoxy, or $C_1$-$C_4$-haloalkoxy;
$R^d$ $C_1$-$C_4$-alkyl, $C_1$-$C_4$-haloalkyl, $C_3$-$C_6$-cycloalkyl, $C_3$-$C_6$-cyclo-alkylmethyl, $C_3$-$C_6$-halocycloalkyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl; or heterocyclyl, heterocyclyl-$C_1$-$C_4$-alkyl, phenyl, hetaryl, phenyl-$C_1$-$C_4$-alkyl, and hetaryl-$C_1$-$C_4$-alkyl, in which groups the ring is unsubstituted, or substituted with halogen, CN, $NO_2$, $C_1$-$C_4$-alkyl, $C_1$-$C_4$-haloalkyl, $C_1$-$C_4$-alkoxy, or $C_1$-$C_4$-haloalkoxy;
$R^e$, $R^f$ independently H, $C_1$-$C_4$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, $C_1$-$C_4$-alkyl-carbonyl, $C_1$-$C_4$-haloalkylcarbonyl, $C_1$-$C_4$-alkylsulfonyl, $C_1$-$C_4$-haloalkylsulfonyl;
  heterocyclyl, heterocyclyl-$C_1$-$C_4$-alkyl, heterocyclylcarbonyl, heterocyclylsulfonyl, phenyl, phenyl carbonyl, phenylsulfonyl, hetaryl, hetarylcarbonyl, hetarylsulfonyl, phenyl-$C_1$-$C_4$-alkyl, and hetaryl-$C_1$-$C_4$-alkyl, in which groups the ring is unsubstituted, or substituted with halogen, CN, $NO_2$, $C_1$-$C_4$-alkyl, $C_1$-$C_4$-haloalkyl, $C_1$-$C_4$-alkoxy, and $C_1$-$C_4$-haloalkoxy; or R$^e$ and R$^f$ are together with the nitrogen atom to which they are bound form a 5-or 6-membered, saturated, or unsaturated heterocycle, in which heterocycle none, or one ring member atom is replaced by O, S or N, and wherein the heterocycle is unsubstituted or substituted with halogen, CN, NO$_2$, C$_1$-C$_4$-alkyl, C$_1$-C$_4$-haloalkyl, C$_1$-C$_4$-alkoxy, or C$_1$-C$_4$-haloalkoxy;

R$^g$, R$^h$ independently H, C$_1$-C$_4$-haloalkyl, C$_3$-C$_6$-cycloalkyl, C$_3$-C$_6$-halocycloalkyl, C$_2$-C$_4$-alkenyl, C$_2$-C$_4$-haloalkenyl, C$_2$-C$_4$-alkynyl, C$_1$-C$_4$-alkoxy-C$_1$-C$_4$-alkyl; heterocyclyl, heterocyclyl-C$_1$-C$_4$-alkyl, phenyl, hetaryl, phenyl-C$_1$-C$_4$-alkyl, and hetaryl-C$_1$-C$_4$-alkyl, in which groups the ring is unsubstituted, or substituted with halogen, CN, NO$_2$, C$_1$-C$_4$-alkyl, C$_1$-C$_4$-alkoxy, or C$_1$-C$_4$-haloalkoxy;

R$^i$ H, C$_1$-C$_4$-alkyl, C$_1$-C$_4$-haloalkyl, C$_3$-C$_6$-cycloalkyl, C$_3$-C$_6$-cycloalkylmethyl, C$_3$-C$_6$-halocycloalkyl, C$_2$-C$_4$-alkenyl, C$_2$-C$_4$-haloalkenyl, C$_2$-C$_4$-alkynyl, C$_1$-C$_4$-alkoxy-C$_1$-C$_4$-alkyl; or phenyl, phenyl-C$_1$-C$_4$-alkyl, in which groups the phenyl rings is unsubstituted, or substituted with halogen, CN, NO$_2$, C$_1$-C$_4$-alkyl, C$_1$-C$_4$-alkoxy, or C$_1$-C$_4$-haloalkoxy;

R$^x$ CN, NO$_2$, C$_1$-C$_4$-alkoxy, C$_1$-C$_4$-haloalkoxy, S(O)$_m$R$^d$, S(O)$_m$NR$^e$R$^f$, C$_1$-C$_{10}$ alkylcarbonyl, C$_1$-C$_4$-haloalkylcarbonyl, C$_1$-C$_4$-alkoxycarbonyl, C$_1$-C$_4$-haloalkoxycarbonyl; or C$_3$-C$_6$-cycloalkyl, 5- to 7-membered heterocyclyl, 5- or 6-membered hetaryl, phenyl, C$_3$-C$_6$-cycloalkoxy, 3- to 6-membered heterocyclyloxy, phenoxy, which are unsubstituted, or substituted with R$^y$;

R$^y$ halogen, CN, NO$_2$, C$_1$-C$_4$-alkyl, C$_1$-C$_4$-haloalkyl, C$_1$-C$_4$-alkoxy, C$_1$-C$_4$-haloalkoxy, S(O)$_m$R$^d$, S(O)$_m$NR$^e$R$^f$, C$_1$-C$_4$-alkylcarbonyl, C$_1$-C$_4$-haloalkylcarbonyl, C$_1$-C$_4$-alkoxycarbonyl, C$_1$-C$_4$-haloalkoxycarbonyl, C$_3$-C$_6$-cycloalkyl, C$_3$-C$_6$-halocycloalkyl, C$_2$-C$_4$-alkenyl, C$_2$-C$_4$-haloalkenyl, C$_2$-C$_4$-alkynyl, or C$_1$-C$_4$-alkoxy-C$_1$-C$_4$-alkyl;

Y O or S; and m is 0, 1 or 2.

2. The agrochemical composition of claim 1 comprising
A) 1 to 25 wt % of propylene carbonate;
B) up to 5 wt % of water; and
C) 1 to 95 wt % of compounds I wherein the concentrations are based on the total weight of the composition.

3. The agrochemical composition of claim 1 comprising
A) 5 to 20 wt % of propylene carbonate;
B) up to 2 wt % of water; and
C) 1 to 90 wt % of compounds I wherein the concentrations are based on the total weight of the composition.

4. The agrochemical composition of claim 1, wherein R$^1$ is CH$_2$CH$_3$, R$^2$ is CH$_3$, R$^3$ is H, R$^N$ is CHR$^4$R$^5$; and wherein
a) R$^4$ is CH$_3$, R$^5$ is CH$_3$;
b) R$^4$ is CF$_3$, R$^5$ is CH$_3$;
c) R$^4$ is CH(CH3)$_2$, R$^5$ is CH$_3$;
d) R$^4$ is CHFCH$_3$, R$^5$ is CH$_3$;
e) R$^4$ is 1-CN-cC$_3$H$_4$, R$^5$ is CH$_3$;
f) R$^4$ is 1-C(O)NH$_2$-cC$_3$H$_4$, R$^5$ is CH$_3$; or
g) R$^4$ and R$^5$ together are CH$_2$CH$_2$CF$_2$CH$_2$CH$_2$.

5. The agrochemical composition of claim 1, wherein R$^1$ is CH$_2$CH$_3$, R$^2$ is CH$_3$, R$_3$ is H, and R$^N$ is CH(CH$_3$)CH(CH$_3$)$_2$.

6. The agrochemical composition of claim 1, wherein the pH of a 1% dilution of the composition in deionized water is in a range from 2 to 6.

7. The agrochemical composition of claim 1, wherein the composition comprises an acid.

8. The agrochemical composition of claim 1, wherein the concentration of cyclohexanone is from 0.1 to 30 wt % based on the total weight of the composition.

9. The agrochemical composition of claim 8, further comprising an acid; wherein the concentration of propylene carbonate is from 0.1 to 50 wt % based on the total weight of the composition.

10. A process for the preparation of the agrochemical composition of claim 1, comprising mixing the propylene carbonate, the cyclohexanone, the compound (I), and, when present, the water.

11. A method for controlling pests, which method comprises the application of the agrochemical composition of claim 1, or a dilution thereof, to plants, plant propagation material, or the locus of growth of the plants; the pests or their food supply, habitat or breeding grounds.

12. The method of claim 11, wherein the composition comprises
A) 5 to 20 wt % of propylene carbonate;
B) up to 2 wt % of water; and
C) 1 to 90 wt % of compounds I wherein the concentrations are based on the total weight of the composition.

13. The method of claim 11, wherein R$^1$ is CH$_2$CH$_3$, R$^2$ is CH$_3$, R$^3$ is H, R$^N$ is CHR$^4$R$^5$; and wherein
a) R$^4$ is CHs, R$^5$ is CH$_3$;
b) R$^4$ is CF$_3$, R$^5$ is CH$_3$;
c) R$^4$ is CH(CH$_3$)$_2$, R$^5$ is CH$_3$;
d) R$^4$ is CHFCH$_3$, R$^5$ is CH$_3$;
e) R$^4$ is 1-CN-cC$_3$H$_4$, R$^5$ is CH$_3$;
f) R$^4$ is 1-C(O)NH$_2$-cC$_3$H$_4$, R$^5$ is CH$_3$; or
g) R$^4$ and R$^5$ together are CH$_2$CH$_2$CF$_2$CH$_2$CH$_2$.

14. The method of claim 11, wherein R$^1$ is CH$_2$CH$_3$, R$^2$ is CH$_3$, R3 is H, and R$^N$ is CH(CH$_3$)CH(CH$_3$)$_2$.

15. The method of claim 11, wherein the pH of a 1% dilution of the composition in deionized water is in a range from 2 to 6.

16. The method of claim 11, wherein the composition comprises an acid.

17. The method of claim 11, wherein the concentration of cyclohexanone is from 0.1 to 30 wt % based on the total weight of the composition.

18. The method of claim 11, wherein the composition comprises
A) 1 to 25 wt % of propylene carbonate;
B) up to 5 wt % of water; and
C) 1 to 95 wt % of compounds I wherein the concentrations are based on the total weight of the composition.

19. An aqueous tank-mix composition comprising the agrochemical composition of claim 1 in a concentration of 0.01 wt % to 10 wt % based on the total weight of the aqueous tank-mix composition.

* * * * *